July 29, 1941.                J. P. LANNEN                2,250,771
                              UNIVERSAL LEVEL
                            Filed July 22, 1940
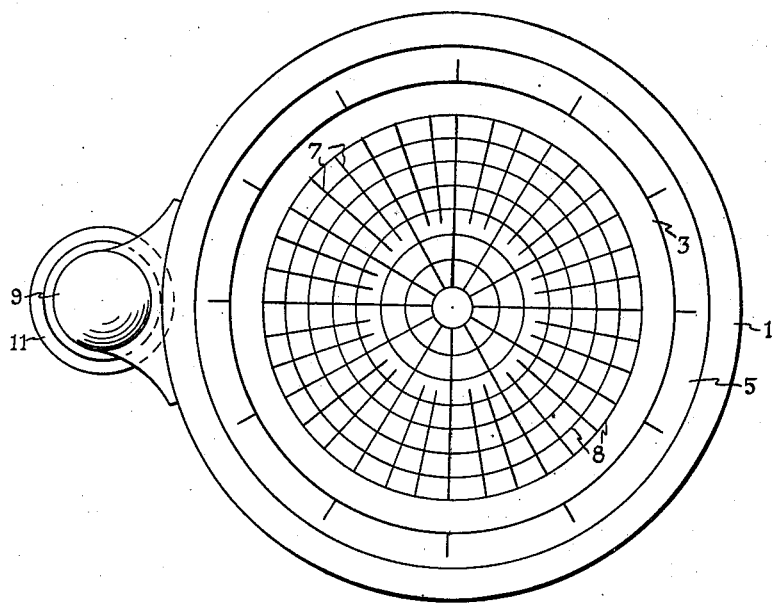
Fig. 1
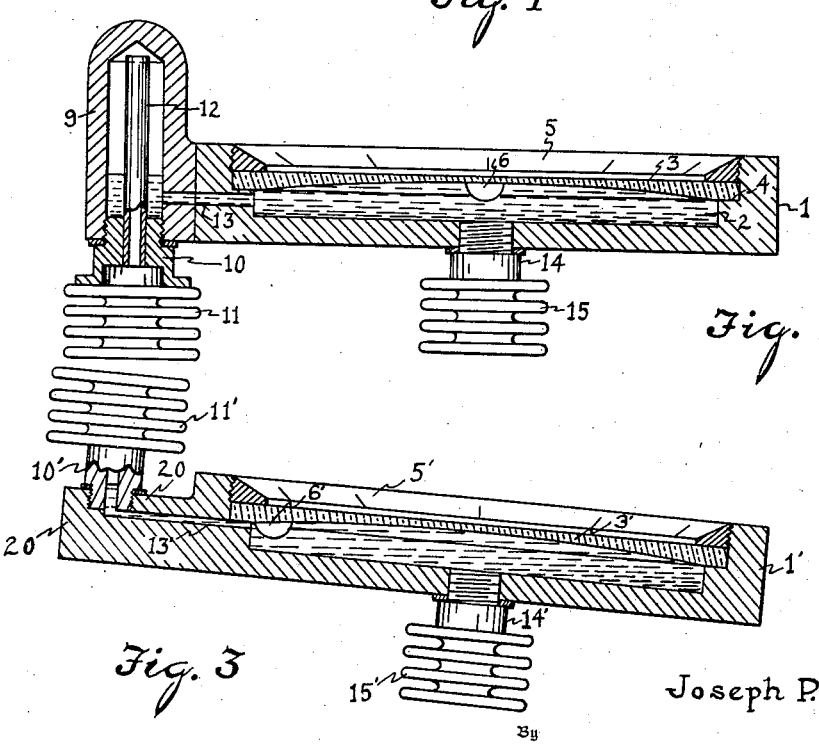
Fig. 2
Fig. 3
Inventor
Joseph P. Lannen
By
Attorney Patented July 29, 1941

2,250,771

UNITED STATES PATENT OFFICE 2,250,771

UNIVERSAL LEVEL

Joseph P. Lannen, Detroit, Mich.

Application July 22, 1940, Serial No. 346,728

9 Claims. (Cl. 33—212)

This invention relates to universal levels and particularly levels of the type in which a body of liquid containing a bubble of air or other gas is confined beneath a transparent plate having a spherically concave bottom, the bubble tending to assume a central position beneath the glass, and lateral travel of the bubble serving to indicate the direction and extent of normal tilting of the instrument.

In such instruments, it is desirable for obvious reasons to maintain the size of the bubble a constant, but such size is influenced by a number of variable factors and principally by temperature and absorption.

An object of the invention is to associate with a universal level of the bubble type a simple and reliable regulating device that will permit the size of the bubble to be readily increased or diminished when necessary.

Another object is to provide for regulating the size of the bubble of a universal level and to employ for that purpose a provision permitting the bubble-entrapping liquid to readily expand or contract responsive to temperature changes.

These and various other objects the invention attains by the construction hereinafter described and illustrated in the accompanying drawing, wherein:

Fig. 1 is a top plan view of the improved level.

Fig. 2 is a diametrical sectional view of the level.

Fig. 3 is a diametrical sectional view of the level in a modified form.

In these views, the reference character 1 designates a shallow circular vessel containing a body of liquid 2 such as alcohol, confined beneath a glass disk 3 seated on an annular shoulder 4 formed interiorly of said vessel. Said disk is clamped firmly on the shoulder and in liquid-sealed relation to the vessel 1 by a ring 5 threaded into the top portion of the vessel. The lower and liquid-engaging face of the disk 3 is spherically concaved so that a bubble 6 of air or other suitable gas trapped in the liquid, tends to assume a position at the vertical axis of the instrument, when the same is level. Any tilting of a work carrier (not shown) or other member to which the described instrument is secured produces radial travel of the bubble 6 in the direction of upward tilting, and the extent of tilting may obviously be measured by the bubble travel.

To afford a definite indication of the direction of such travel there is provided on the disk 3 a set of radial graduations 7 extending from the center substantially to the periphery of the disk, and for measuring the extent of bubble travel the disk is further provided with a set of equally spaced circles 8 centered at the vertical axis of the instrument. The innermost of these circles is of the diameter to which it is desired to conform the bubble.

Describing now the means for regulating the size of the bubble, a dome-shaped chamber 9 is peripherally carried by the vessel 1, being integral with the latter in the illustrated embodiment of the invention and preferably projecting somewhat above said vessel. The chamber 9 is interiorly threaded at its lower end to receive a closure 10 to which is secured the upper end of a vertically compressible Sylphon 11 of the usual corrugated type and which further carries a tube 12 communicating with the Sylphon and projecting upwardly within the chamber 9 in spaced relation to the wall and top of the latter. A restricted passage 13 establishes communication between the vessel 1 and chamber 9, whereby the liquid 2 may rise in said chamber to or above its maximum level in said vessel. The Sylphon 11, tube 12, and upper portion of the chamber 9 contain only air or such other gas as forms the bubble 6.

Opening into the vessel 1 through its bottom is a tubular fitting 14 carrying and communicating with a second Sylphon 15, receiving a portion of the body of liquid occupying said vessel.

In use of the described level, when for any reason the bubble becomes unduly large, a slight pressure is applied to the Sylphon 11 and is maintained while the instrument is tilted in a direction and to an extent to shift the bubble into substantial communication with the passage 13. The described pressure imposes a slight compression on the air or gas occupying the upper portion of the chamber 9, thus inducing a momentary flow of liquid through the passage 13 into the vessel 1. At the same time the Sylphon 15 expands to accommodate such additional liquid as enters the vessel 1. Pressure on the Sylphon 11 is relieved after tilting the instrument as described, and both Sylphons then regain their normal form, thus inducing a flow through the passage 13 into the chamber 9. Since the bubble is in communication with said passage, it becomes reduced in volume by delivery of a portion of its air or gas into the chamber 9. The extent of reduction of the bubble may be predetermined by the amount of pressure initially applied to the Sylphon 11, or the instrument may be tilted back to normal when a sufficient reduction has occurred.

To increase size of the bubble, there is applied to the Sylphon 11 a pressure sufficient to lower the liquid level in the chamber 9 below the passage 13, the displaced liquid escaping through said passage into the vessel 1 and a like displacement occurring into the Sylphon 15, as in the first-described operation. Air or gas flows from the chamber 9 through the passage 13 as soon as permitted by depression of liquid level, and increases the volume of the bubble. When the bubble has been restored to normal size, pressure on the Sylphon 11 is relieved. The reverse flow occurring through the passage 13 immediately following relief of Sylphon pressure has no effect on the bubble, which is kept away from said passage during the described operation.

In the modification disclosed by Fig. 3, the shallow vessel 1', disk 3', and ring 5' conform to description already given. Means for regulating size of the bubble 6' comprise first a lug 20 carried peripherally and preferably integrally by the vessel 1'. Threaded into and upstanding from said lug is a tubular member 10', communicating at its lower end with a passage 13' leading into the vessel 1', the upper end of said member carrying and communicating with a vertically compressible, upstanding Sylphon 11' of the type already described. Liquid in the member 10' is approximately level with that in the vessel 1', the space above the liquid in said member and in the Sylphon being filled with air or such gas as forms the bubble. A tubular fitting 14' opening centrally into the bottom of the vessel 1' and a second Sylphon 15' carried thereby, conform to first described form of the invention.

The instrument as shown in Fig. 3 is tilted to locate the bubble in proximity to the passage 13', preparatory to reducing the bubble size.

The modification conforms in its operation to the construction first described, and has an advantage over the latter in that the gas-compressing Sylphon is above liquid level and hence cannot possibly receive any portion of the liquid. The first described construction is best suited for any use likely to subject it to accidental pressure, since both Sylphons, 11 and 15, are located beneath the instrument where neither is likely to be inadvertently disturbed.

Provisions heretofore available for correcting the bubble size have required considerable skill and time in making a correction. The present construction is exceedingly simple in operation and permits of a quick, accurate and easy regulation.

A further advantage secured by the invention, in either disclosed form, lies in the fact that the liquid in reaching its gas absorption limit may draw upon the relatively large volume of gas occupying the gas-compressing Sylphon instead of concentrating its absorption effect on the bubble. Thus the bubble is rendered much less responsive to variations in the absorptive capacity of the liquid, which variations heretofore have tended to materially increase the bubble, responsive to a decrease of liquid absorptive capacity and to decrease the bubble responsive to an increase of such capacity.

What I claim is:

1. A universal level comprising an open-topped vessel, a transparent cover for said vessel having its bottom face forming a substantially spherical concavity, means establishing a liquid seal between the vessel and cover, a liquid occupying said vessel and trapping a gas bubble against the concave face of the cover, and a sealed chamber occupied at least partially by gas materially exceeding the bubble in volume and communicating with said vessel and contractible to discharge a desired portion of gas into the vessel to augment the bubble, said vessel having a provision for accommodating liquid displaced by augmentation of the bubble.

2. A universal level as set forth in claim 1, the communication of said chamber with the vessel being at the periphery of the vessel.

3. In a universal level as set forth in claim 1, a second sealed chamber communicating with said vessel for receiving liquid displaced from the vessel by liquid forced into the vessel in advance of gas from the first mentioned chamber.

4. In a universal level as set forth in claim 1, a second sealed chamber, liquid filled and communicating with said vessel, and expansible to receive additional liquid forced into the vessel in advance of gas from the first mentioned chamber.

5. In a universal level as set forth in claim 1, a second sealed chamber disposed beneath said vessel and communicating with said vessel through the vessel bottom, and expansible to receive liquid displaced from the vessel by liquid forced into the vessel in advance of gas from the first mentioned chamber.

6. A universal level comprising an open-topped vessel, a transparent cover for said vessel having its bottom face forming a substantially spherical concavity, means establishing a liquid seal between the vessel and cover, a liquid occupying said vessel and trapping a gas bubble against the concave face of the cover, a sealed chamber carried by said vessel, upwardly extending beyond said cover and occupied in its upper portion by a volume of gas materially exceeding the bubble and having its lower portion in communication with the peripheral portion of the vessel, and means carried by said chamber for introducing additional gas into said chamber without unsealing such chamber, to effect displacement of gas from the chamber into the vessel.

7. A universal level comprising an open-topped vessel, a transparent cover for said vessel having its bottom face forming a substantially spherical concavity, means establishing a liquid seal between the vessel and cover, a liquid occupying said vessel and trapping a gas bubble against the concave face of the cover, a sealed chamber carried by said vessel, upwardly extending beyond said cover and occupied in its upper portion by a volume of gas materially exceeding the bubble and having its lower portion in communication with the peripheral portion of the vessel, a gas filled, contractible and expansible chamber carried by and beneath the first mentioned chamber, and a passage extending upwardly from the contractible chamber and opening into the upper portion of the first mentioned chamber.

8. A universal level comprising an open-topped vessel, a transparent cover for said vessel having its bottom face forming a substantially spherical concavity, means establishing a liquid seal between the vessel and cover, a liquid occupying said vessel and trapping a gas bubble against the concave face of the cover, a sealed chamber carried by said vessel, and in communication with the peripheral portion of the vessel and having an upper portion occupied by a volume of gas materially exceeding the bubble, a gas filled contractible and expansible chamber carried by said vessel in proximity and exterior to the first mentioned chamber, and a passage adapted to deliver gas from the contractible chamber into the first mentioned chamber above the liquid level therein.

9. A universal level comprising an open-topped vessel, a transparent cover for said vessel having a concaved bottom face, means establishing a liquid seal between the vessel and cover, a liquid occupying said vessel and trapping a gas bubble against the concave face of the cover, said vessel having a restricted passage outwardly opening therefrom and normally liquid-filled, and a gas-filled chamber carried by and outstanding upon said vessel and communicating with said passage and downwardly contractible to expel liquid from said passage into said vessel, and to subsequently deliver gas into the vessel to augment the bubble, said vessel having a provision for accommodating liquid displaced by augmentation of the bubble.

JOSEPH P. LANNEN.